United States Patent [19]

Senz

[11] Patent Number: 4,677,146
[45] Date of Patent: Jun. 30, 1987

[54] MODIFIED ASPHALT COMPOSITIONS COMPRISING A NITROGEN DERIVATIVE OF AN ESTERIFIED COPOLYMER

[75] Inventor: R. John Senz, Mentor, Ohio

[73] Assignee: The Lubrizol Corporation, Wickliffe, Ohio

[21] Appl. No.: 860,280

[22] Filed: May 5, 1986

[51] Int. Cl.$^4$ ............................................ C08L 95/00
[52] U.S. Cl. ................... 524/69; 524/68; 106/273 N; 525/54.5
[58] Field of Search ............... 524/68, 69; 106/277 N; 525/54.5

[56] References Cited

U.S. PATENT DOCUMENTS

| | | | |
|---|---|---|---|
| 2,389,379 | 11/1945 | McCulloch | 117/65 |
| 2,935,486 | 5/1960 | Sayko et al. | 260/28.5 |
| 3,531,426 | 9/1970 | Shim et al. | 526/69 |
| 3,547,850 | 12/1970 | Montgomery | 260/28.5 |
| 3,933,761 | 1/1976 | Coleman | 525/327.6 |
| 4,070,325 | 1/1978 | Burke | 524/239 |
| 4,316,829 | 2/1982 | Roberts | 523/214 |
| 4,338,231 | 7/1982 | Marzocchi et al. | 523/214 |
| 4,393,155 | 7/1983 | Garrett, Jr. | 524/60 |
| 4,511,369 | 4/1985 | Denis et al. | 525/329.5 |
| 4,544,690 | 10/1985 | Ladish | 524/60 |
| 4,547,225 | 10/1985 | Grossi et al. | 106/273 N |
| 4,576,648 | 3/1986 | Dermangeon et al. | 106/269 |
| 4,604,221 | 8/1986 | Bryant et al. | 525/329.5 |

FOREIGN PATENT DOCUMENTS

| | | | |
|---|---|---|---|
| 0115354 | 9/1981 | Japan | 524/68 |
| 0158256 | 8/1985 | Japan | 524/69 |

*Primary Examiner*—Herbert J. Lilling
*Attorney, Agent, or Firm*—Denis A. Polyn; Forrest L. Collins; Karl Bozicevic

[57] ABSTRACT

Modified asphalt compositions are described which comprise
(A) asphalt, and
(B) a minor amount, sufficient to reduce or retard degradation of the asphalt in service, of at least one carboxy ester-containing interpolymer derived from
  (B-1) at least one olefin monomer, and
  (B-2) at least one alpha, beta-unsaturated carboxylic acid or derivative thereof, said interpolymer having (1) pendant carboxylic acid ester groups derived from the esterification of the carboxy groups of the interpolymer with at least one alcohol containing at least about 4 carbon atoms.

Generally, the modified asphalt composition will contain from about 0.01 to about 10% by weight, based on the weight of the asphalt, of the ester of a carboxy interpolymer as defined. The modified asphalt compositions of the present invention are useful in roofing applications and in preparing aggregate-containing asphalt concretes which can be employed as paving compositions.

39 Claims, No Drawings

MODIFIED ASPHALT COMPOSITIONS COMPRISING A NITROGEN DERIVATIVE OF AN ESTERIFIED COPOLYMER

TECHNICAL FIELD OF THE INVENTION

This invention relates to modified asphalt compositions and more particularly to modified asphalt compositions comprising asphalt and a minor amount, sufficient to reduce or retard degradation of the asphalt in service, of at least one ester of a carboxy interpolymer of at least one olefin monomer and an alpha, beta-unsaturated acid or derivative thereof. The modified asphalt compositions are useful in a variety of applications including roofing and paving. The modified asphalts are useful particularly in preparing improved asphalt concrete compositions for paving compositions.

BACKGROUND OF THE INVENTION

The term "asphalt" or "asphalt cement" as used in the description of the present application refers to any of a variety of solid or semi-solid materials at room temperature which gradually liquify when heated, and in which the predominant constituents are naturally occurring bitumens or which are obtained as residue in petroleum refining. Asphalt is further defined by Kirk-Othmer, Encyclopedia of Chemical Technology, Vol. 3, Third Ed. (1978) pp. 284–327, John Wiley & Sons, N.Y. An additional discussion appears in the publication entitled "A Brief Introduction to Asphalt and Some of its Uses", Manual Series No. 5 (MS-5), The Asphalt Institute, 7th Ed., September, 1974. Both of these references are hereby incorporated by reference.

Asphalt cements have found particular utility when combined with aggregates. Such combinations, generally referred to as "asphalt concrete", are employed extensively as paving compositions for roads, driveways, parking lots, airport runways, etc. The asphalt is converted to a fluid state when paving a road. One fluid form is the suspension or emulsion of the asphalt in water. After spreading and compressing the aggregate-containing asphalt, water evaporates or separates, and the asphalt hardens into a continuous mass. Another form of asphalt employed in road construction is a cut-back, i.e., a liquid petroleum product produced by fluxing an asphaltic base with a suitable organic solvent or distillate. A road is formed by paving the aggregate-containing cutback and evaporating the volatile distillate from the mass. An advantage of using the above road construction techniques is the avoidance of high temperature application. In an alternative and most widely used technique, the asphalt and aggregate can be mixed and applied at elevated temperatures at the fluid state of the asphalt to form the road. This form of asphalt, which is neither cut-back nor emulsififed generally is referred to as asphalt cement.

The degree and rate of hardening of asphalt cement during application and while in service ("age hardening") are factors affecting the durability of a surface such as a road pavement. A certain amount of hardening of a freshly applied surface is often desirable in order to allow the newly placed surface to placed into service quickly. However, excessive hardening and loss of ductility of an asphalt based surface can dramatically reduce its useful lifetime. Januszke, in "Industrial Engineering Chemistry Product Research and Development", Vol. 10, (1971), 209–213, indicates that lead and zinc diethyldithiocarbamates were effective in inhibiting the adverse hardening.

In certain geographic areas, such as desert regions in the western and southwestern United States, deterioration of an asphalt road may occur quickly and is often extensive. Embrittlement and cracking of the road surface often result.

Because of the high demand for better quality materials for roofs and for the pavement of roads, airfields and other applications, there have been many suggestions in the art for producing improved asphaltic compositions.

It is known in the art that excessive age hardening of paving asphalts can be reduced through the use of certain antioxidants such as lead or zinc dithiocarbamates. The above-mentioned reference by Januszke discusses an evaluation of the effect of 24 antioxidants on paving asphalt durability and is incorporated by reference for its teachings regarding the problem and methods of assessing the performance of additives.

It also has been suggested, for example, that the properties of asphalt can be improved by incorporating into the asphalt, small amounts of maleic anhydride. In U.S. Pat. No. 2,347,626, a process is described for hardening asphaltic residues by reacting maleic anhydride with asphaltic petroleum residue containing unsaturated ingredients by heating the mixture to a temperature of from about 150°-250° C. until the softening point of the reaction product is substantially higher than that of the starting residue.

U.S. Pat. No. 4,139,511 describes asphalt compositions containing an epoxy resin, maleinated asphaltic materials obtained by reacting an asphaltic material with maleic anhydride and a ratio by weight of 100:0.2 to 100 at at a temperature of 100°-300° C. The asphaltic compositions also may contain a curing agent for the epoxy resin. U.S. Pat. No. 4,139,511 also describes in Cols. 1 and 2, a number of Japanese publications including laid-open patent applications and publications in various Japanese Patent Gazettes which disclose asphaltic materials modified with various compositions such as (a) an adduct of maleic anhydride to asphalt with a polyhydric alcohol to produce a polyester containing hydroxyl groups which are then reacted with fatty acids for esterification; (b) bitumens containing carboxylic and/or acid anhydride groups and polymers or copolymers containing said groups (Japanese Patent Application Laying-Open Gazette No. 157415/75); bitumens modified with maleic anhydride and containing rubber-like materials such as styrene-butadiene rubber; bitumens containing epoxy resins and primary polyamines; etc.

U.S. Pat. No. 2,550,476 describes mineral aggregate bonding compositions which comprise a bitumen and a small amount of a condensation product prepared by reacting an olefin containing from 5 to 25 carbon atoms with an unsaturated dicarboxylic acid anhydride to form an intermediate which is then further reacted with a diamine. Only aliphatic olefins containing from 5 to 20 carbon atoms are described.

SUMMARY OF THE INVENTION

Modified asphalt compositions are described which comprise
(A) asphalt, and
(B) a minor amount, sufficient to reduce or retard degradation of the asphalt in service, of at least one carboxy ester-containing interpolymer derived from
    (B-1) at least one olefin monomer, and (B-2) at least one alpha, beta-unsaturated carboxylic acid or derivative thereof, said interpolymer having (1) pendant carboxylic acid ester groups derived from the esterification of the carboxy groups of the interpolymer with at least one alcohol containing at least about 4 carbon atoms.

Generally, the modified asphalt composition will contain from about 0.01 to about 10% by weight, based on the weight of the asphalt, of the ester of a carboxy interpolymer as defined. The modified asphalt compositions of the present invention are useful in roofing and in preparing aggregate-containing asphalt concretes which can be employed as paving compositions.

DESCRIPTION OF THE PREFERRED EMBODIMENTS

The present invention relates to modified asphalt compositions, and more particularly, to modified asphalt compositions such as asphalt cements which, when combined with aggregates, will form asphalt concretes exhibiting significantly improved physical properties, and, in particular, desirable age-hardening characteristics.

The asphalts which can be modified in accordance with the invention include natural asphalts and petroleum tar (petroleum asphalt) which is generally known for roofing and paving applications. The natural asphalt includes, for example, asphaltite such as gilsonite, grahamite and glance pitch; lake asphalt such a trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The petroleum tars that may be modified include oil gas tar obtained as a by-product when gases are produced from petroleum fractions, such tar in refined form, cut-back tar obtained by mixing a light petroleum fraction with such tar, and tar pitch obtained as a residue by removing the volatile fraction from such tar. Any of these kinds of asphalt may be used singly or jointly. Straight asphalt is preferred for paving applications and oxidized and blown asphalts are preferred for roofing applications.

As used herein, the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalt cements are generally characterized by a penetration of less than 400 at 25° C., and a typical penetration is between 40 and 300 (ASTM Standard, Method D-5). The viscosity of asphalt cement at 60° C. is more than about 65 poise.

Asphalt cements are often defined in terms specified by the American Association of State Highway Transportation Officials (AASHTO) AR viscosity system. Two sets of typical specifications are as follows.

| TEST | AASHTO M-226 | | | | | |
|---|---|---|---|---|---|---|
| | AC 2.5 | AC 5 | AC 10 | AC 20 | AC 30 | AC 40 |
| Vis @ 140° F., poise (AASHTO T-202) | 250 +−50 | 500 +−100 | 1000 +−200 | 2000 +−400 | 3000 +−600 | 4000 +−800 |
| Vis @ 275° F., CST, minimum (AASHTO T-201) | 125 | 175 | 250 | 300 | 350 | 400 |
| Pen @ 77° F., minimum (AASHTO T-49) | 220 | 140 | 80 | 60 | 50 | 40 |
| Flash Point, COC Minimum °F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Vis After TFTO (AASHTO T-179) @ 140° F., poise minimum | 1000 | 2000 | 4000 | 8000 | 12000 | 16000 |

| TEST | AASHTO M-226 | | | | |
|---|---|---|---|---|---|
| | AR1000 | AR2000 | AR4000 | AR8000 | RT1600 |
| Vis @ 140° F., poise (AASHTO T-202) | 1000 +−250 | 2000 +−500 | 4000 +−1000 | 8000 +−2000 | 16000 +−4000 |
| Vis @ 275° F., CST minimum (AASHTO T-201) | 140 | 200 | 275 | 400 | 550 |
| Pen @ 77° F., minimum (AASHTO T-49) | 65 | 40 | 25 | 20 | 20 |
| Percent Of Original Penn @ 77° F., minimum | — | 40 | 45 | 50 | 52 |
| Ductility @ 77° F., minimum, 5 cm/min | 100 | 100 | 75 | 75 | 75 |

Bitumens or asphalts are modified in accordance with the procedure of the invention by incorporating therein (B) a minor amount of at least one carboxy ester-containing interpolymer of (B-1) at least one olefin monomer, and (B-2) at least one alpha, beta-unsaturated carboxylic acid or derivative thereof, said interpolymer having (1) pendant carboxylic acid ester groups derived from the esterification of the carboxy groups of the interpolymer with at least one alcohol containing at least about 4 carbon atoms.

Preferably the esters of the carboxy-containing interpolymers are mixed esters derived from (1-a) at least one higher molecular weight alcohol containing at least 7 carbon atoms and (1-b) at least one lower molecular weight alcohol containing from one to 6 carbon atoms. In another preferred embodiment, the mixed ester interpolymer also has (2) at least one pendant carbonyl polyamino group derived from the reaction of at least one of the carboxy groups of the interpolymer with (2-a) at least one amino compound having at least one primary or secondary amino group and/or (2-b) hydrazine or at least one hydrocarbon-substituted hydrazine.

In one embodiment of the present invention, the extent of esterification in relation to the extent of neutralization of the unesterified carboxy groups of the carboxy-containing interpolymer through the conversion thereof to amino-containing groups is a consideration. For convenience, the relative proportions of the high molecular weight ester group to the low molecular weight ester group and to the polyamino group are expressed in terms of molar ratios of (60–90):(10–30):(2–15), respectively. The preferred ratio is (70–80):(15–25):5. It should be noted that the linkage described as the carbonyl-amino group may be amide, imide, or amidine, and inasmuch as any such linkage is contemplated within the present invention, the term "carbonyl-amino" is thought to be a convenient, generic expression useful for the purpose of defining the inventive concept.

The carboxy-containing interpolymers useful in preparing the esters useful in the invention are copolymers, terpolymers, and other interpolymers of alpha, beta-unsaturated carboxylic acids, dicarboxylic acids or derivatives thereof, (particularly esters) or mixtures of two or more of any of these, and one or more olefin monomers. The derivatives of the carboxylic acid are derivatives which are polymerizable with the monoolefinic compound, and as such, may be the esters and anhydrides of the acids.

Suitable olefins include ethylene, propylene, isobutene, styrene, para-t-butyl styrene, para-methyl styrene, etc. Vinyl aromatic monomers are preferred in the preparation of the interpolymers. Vinyl aromatic monomers of up to about 12 carbon atoms which can be polymerized with the alpha, beta-unsaturated dicarboxylic acids, anhydrides or lower esters thereof are well known. The nature of the vinyl aromatic monomer is normally not a critical or essential aspect of this invention as these compounds serve primarily as a connective moiety for the alpha, beta-unsaturated compounds in forming the interpolymers. The vinyl aromatic compounds include styrene and substituted styrenes such as alpha-halostyrenes, lower alkyl-substituted styrenes such as alpha-methylstyrene, para-tertbutylstyrene, alpha-ethylstyrene, and para-lower alkoxy styrenes. Mixtures of two or more vinyl aromatic monomers can be used.

Suitable alpha, beta-unsaturated carboxylic or dicarboxylic acids, anhydrides or lower alkyl esters thereof useful in the preparation of the interpolymers include those wherein a carbon-to-carbon double bond is an alpha, beta-position to at least one of the carboxy functions (e.g., acrylic acid, itaconic acid, anhydride or lower esters thereof) and preferably, in an alpha, beta-position to both of the carboxy functions of the alpha, beta-dicarboxylic acid, anhydride or the lower alkyl ester thereof (e.g., maleic acid, anhydride or the lower alkyl ester thereof). Normally, the carboxy functions of these compounds will be separated by up to 4 carbon atoms, preferably 2 carbon atoms.

The monocarboxylic acids include, for example, acrylic acid, methacrylic acid, etc. Esters of such acids also are contemplated.

A class of preferred alpha, beta-unsaturated dicarboxylic acid, anhydrides or the lower alkyl esters thereof, includes those compounds corresponding to the formulae:

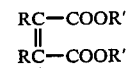

and

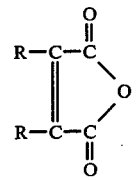

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl of up to about 7 carbon atoms (e.g., methyl, ethyl, butyl or heptyl). These preferred alpha, beta-unsaturated dicarboxylic acids, anhydrides or alkyl esters thereof contain a total carbon content of up to about 25 carbon atoms, normally up to about 15 carbon atoms. Examples include maleic anhydride; benzyl maleic anhydride; chloro maleic anhydride; heptyl maleate; citaconic anhydride; ethyl fumarate; fumaric acid; mesaconic acid; ethyl isopropyl maleate; isopropyl fumarate; hexyl methyl maleate; phenyl maleic anhydride and the like. These and other alpha, beta-unsaturated carboxylic compounds are well known in the art. Of these preferred alpha, beta-unsaturated dicarboxylic compounds, maleic anhydride, maleic acid and fumaric acid and the alkyl esters thereof are preferred. Interpolymers derived from mixtures of two or more of any of these can also be used.

Alternatively, the ester (OR') group may contain more than 7 carbon atoms, being derived from a mixture of alcohols, some containing over 7 carbon atoms, and in such instances, the ester group may remain attached to the carboxy group during and after formation of the interpolymer. This procedure provides a method of introducing the desirable ester groups initially, and eliminates the need to introduce the ester groups in a separate subsequent step.

An important element of the present invention is the molecular weight of the carboxy-containing interpolymer from which the esters are derived. For convenience, the molecular weight is expressed in terms of the "reduced specific viscosity" of the interpolymer which is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30°±0.2° C. Whenever reference is made in this application to RSV or reduced specific viscosity, the reference is to the interpolymer before it is esterified. For purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in Paul J. Flory, *Principles of Polymer Chemistry*, (1953 Edition) pages 308 et seq.

While interpolymers having a reduced specific viscosity of from about 0.05 to about 2 are contemplated in the present invention, the preferred interpolymers are those having a reduced specific viscosity of from about 0.15 to about 1. In most instances, interpolymers having a reduced specific viscosity of from about 0.3 to about 1 are particularly useful.

Mixtures of two or more compatible (i.e., nonreactive to one another) interpolymers which are separately prepared are contemplated for use herein if each has a RSV as above described. Thus, as used herein, and in the appended claims, the terminology "interpolymer" refers to either one separately prepared interpolymer or a mixture of two or more of such interpolymers. A separately prepared interpolymer is one in which the reactants and/or reaction conditions are different from the preparation of another interpolymer.

Particularly preferred interpolymers useful in this invention are those of interpolymers made by reacting maleic acid, or anhydride or the lower esters thereof with styrene. Of these particularly preferred interpolymers those which are made of maleic anhydride and styrene and have a RSV in the range of about 0.3 to about 1.0 are especially useful. Of these latter preferred interpolymers, copolymers of maleic anhydride and styrene having a molar ratio of the maleic anhydride to styrene of about 1:1 are especially preferred. They can be prepared according to methods known in the art, as for example, free radical initiated (e.g., by benzoyl peroxide) solution polymerization. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; and 3,723,375. These patents are incorporated herein by reference for their teaching of the preparation of suitable maleic anhydride and styrene containing interpolymers. Other preparative techniques are known in the art.

The molecular weight (i.e., RSV) of such interpolymers can be adjusted to the range required in this invention, if necessary, according to conventional techniques, e.g., control of the reaction conditions.

The nitrogen-containing mixed esters useful in this invention are most conveniently prepared by first esterifying the carboxy-containing interpolymer with a relatively high molecular weight alcohol and a relatively low molecular weight alcohol to convert at least about 50% and up to about 98% of the carboxy group of the interpolymer to ester groups and then neutralizing the remaining carboxy groups with a polyamine or a hydrazine such as described below to obtain the preferred nitrogen-containing esters.

To incorporate the appropriate amounts of the two alcohol groups into the polymer to form mixed esters, the ratio of the high molecular weight alcohol to the low molecular weight alcohol used in the process should be within the range of from about 2:1 to about 9:1 on a molar basis. In most instances, the ratio is from about 2.5:1 to about 5:1.

The alcohols from which the esters of this invention are prepared include alcohols having at least about 4 aliphatic carbon atoms and preferably at least about 7 carbon atoms, e.g., high molecular weight alcohols having from about 7 to about 40 aliphatic carbon atoms and preferably alcohols having from about 7 to about 30 aliphatic carbon atoms or from about 8 to about 24 carbon atoms. Examples of the ester group (OR') included n-butyloxy, n-pentyloxy, n-hexyloxy and the various isomers. Specific examples of the high molecular weight carboxylic-ester groups, i.e., the (OR') group of the ester group —C(O)OR' includes heptyloxy, isooctyloxy, decyloxy, dodecyloxy, tridecyloxy, pentadecyloxy, octadecyloxy, eicosyloxy, tricosyloxy, tetracosyloxy, heptacosyloxy, triacontyloxy, hentriacontyloxy, tetracontyloxy, etc.

In preparing the mixed-esters of the carboxyinterpolymers, one or more of the low molecular weight alcohols having from 1 to 6 aliphatic carbon atoms may be used separately or in combination with the high molecular weight aliphatic alcohols. Specific examples of the low molecular weight ester groups, i.e., the (OR) group, include methyloxy, ethyloxy, n-propyloxy, isopropyloxy, n-butyloxy, sec-butyloxy, isobutyloxy, n-pentyloxy, neo-pentyloxy, n-hexyloxy, cyclohexyloxy, cyclopentyloxy, 2-methyl-butyl-1-oxy, 2,3-dimethylbutyl-1-oxy, etc. Although the nitrogen-containing esters may be prepared from one or more of the aliphatic alcohols, it is also advantageous to prepare a nitrogen-containing mixed ester from mixtures or a combination of high molecular weight and low molecular weight aliphatic alcohols. Other substituents, i.e., polar substituents, etc., which may be present in the ester radicals in amounts ranging from about 0 to about 10 molar percent may include, for example, the chloro, bromo, ether, nitro, etc., and various combinations thereof. In preparing the mixed esters, the high molecular weight aliphatic alcohol may be used in an amount ranging from about 1.0 to 10 moles of said high molecular weight alcohol for each 1.0 mole of the low molecular weight alcohol. Preferably, however, the mixed esters are prepared from alcohols wherein the high molecular weight aliphatic alcohol is present in an amount ranging from about 2 to 9 moles of said high molecular weight aliphatic alcohol and preferably from about 2.5 to 5.0 moles of said high molecular weight alcohol for each mole of said low molecular weight aliphatic alcohol.

Moreover, one or more of the high molecular weight and one or more of the low-molecular weight alcohols may be reacted either alone or in combination. A preferred class of alcohols includes the commercially available mixtures of alcohols. One class of commercial alcohols includes, the oxoalcohols which comprises, for example, a mixture of alcohols having from about 8-24 carbon atoms. Of the various commercial alcohols, another preferred class of alcohols includes the alcohols having from about 8 to 30 aliphatic carbon atoms. The alcohols may comprise, for example, octyl alcohol, decyl alcohol, dodecyl alcohol, tetradecyl alcohol, pentadecyl alcohol, eicosyl alcohol, octadecyl alcohol, etc.

Examples of the carbonyl amino group include those derived from amino compounds having one primary or secondary amino group and at least one mono-functional amino group such as tertiary-amino or heterocyclic amino groups. Such compounds may thus be tertiary-aminosubstituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxacarbamyl, thiocarbamyl, uracils, hydantoins, thiohydantoins, guanidines, ureas, sulfonamides, phosphoramides, phenolthiazines, amidines, etc. Examples of such polyamino compounds include dimethylamino-ethylamine, dibutylamino-ethylamine, 3-dimethylamino-1-propylamine, 4-methylethylamino-1-butylamine, pyridyl-ethylamine, N-morpholinoethylamine, tetrahydropyridyl-ethylamine, bis-(dimethylamino)propylamine, bis-(diethylamino)ethylamine, N,N-dimethyl-p-phenylene diamine, piperidyl-ethylamine, 1-aminoethyl pyrazone, 1-(methylamino)pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutylalphachlorosuccinimide, 3-aminoethyl uracil, 2-aminoethyl pyridine, ortho-aminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyl-dithiocarbamate, etc. For the most part, the amines are those which contain only one primary-amino or secondary-amino group and, preferably at least one tertiary-amino group. The tertiary amino group is preferably a heterocyclic amino group. In some instances polyamino compounds may contain up to about 6 amino groups although, in most instances, they contain one primary-amino group and either one or two tertiary-amino groups. The polyamino compounds may be aromatic or aliphatic amines and are preferably heterocyclic amines such as aminoalkyl-substituted morpholines, piperazines, pyridines, benzopyrroles, quinolines, pyrroles, etc. They are usually amines having from 4 to about 30 carbon atoms, preferably from 4 to about 12 carbon atoms. Polar substituents may likewise be present in the amines.

The carbonyl-amino gorups of the nitrogen-containing esters of this invention also may comprise the groups derived from hydrazine and/or a hydrocarbon-substituted hydrazine including, for example, the mono-, di-, tri-, and tetrahydrocarbon-substituted hydrazines wherein the hydrocarbon substituent is either an aliphatic or aromatic substituent including, for example, the alkyl-, e.g., cyclic and/or acyclic groups, aryl-, alkylaryl-, aralkyl, etc. The hydrocarbon substituents, generally, contain up to about 24 aliphatic carbon atoms and preferably up to about 12 aliphatic carbon atoms. The preferred substituents, however, include for example, phenyl, alkylphenyl or an alkyl group wherein the alkyl is either a methyl, ethyl, propyl, butyl, pentyl, octyl, cyclohexyl, decyl or dodecyl, etc. Other examples of the hydrocarbon groups inlcude octyldecyl, behenyl, benzyl, heptaphenyl, alpha-naphthyl, beta-naphthyl, butyl-naphthyl, oleyl, stearyl, etc. Of the various hydrocarbon-substituted hydrazines, a preferred class includes the N,N-dihydrocarbon-substituted hydrazines, e.g., the dimethyl, diethyl, diphenyl and dibutyl hydrazines.

The esterification can be accomplished simply by heating the carboxy-containing interpolymer and the alcohol or alcohols under conditions typical for effecting esterification. Such conditions usually include, for example, a temperature of at least about 80° C., preferably from about 150° C. to about 350° C., provided that the temperature be below the decomposition point of the reaction mixture, and the removal of water of esterification as the reaction proceeds. Such conditions may optionally incude the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoride-triethylamine, hydrochloric acid, ammonium sulfate, phosphoric acid, sodium methoxide or the like. These conditions and variations thereof are well known in the art.

When utilizing a combination of a high molecular weight and a low molecular weight alcohol, the esterification may be carried out, for example, by initially esterifying at least about 50 molar percent and preferably from about 50 to 75% of the carboxy radicals with the high molecular weight alcohol and then subsequently esterifying the partially-esterified carboxy interpolymer with a low molecular weight alcohol, e.g., 2–4 aliphatic carbon atoms, to obtain a carboxy interpolymer having approximately 50-75 molar percent of the carboxylic groups esterified with the high molecular weight aliphatic alcohol and approximately 23-48 molar percent of the carboxy radicals esterified with the low molecular weight aliphatic alcohol. For example, esterification with a combination of high and low molecular weight alcohols may be accomplished, in sequence, by first carrying out the esterification with the high molecular weight alcohol, e.g., up to about 75 molar percent and subsequently esterifying up to about 98 molar percent of the carboxylic groups with the low molecular weight alcohol. Alternatively, by the carboxylic groups of the interpolymer may be simultaneously esterified with a mixture of the alcohols to obtain an esterified-carboxy interpolymer having up to about 60, 70, 80, 90, 95 or 98 mole percent of the carboxylic groups esterified with the high and low molecular weight aliphatic alcohols.

Following esterification of the carboxy groups of the interpolymer with either one or more of the high and low molecular weight alcohols, at least about 2.0 molar percent and approximately 2.0 to 50 molar percent and preferably from about 5 to 25 molar percent of the carboxy group of said interpolymer may be reacted with the amino compound, hydrazine, or a hydrocarbon-substituted hydrazine at temperatures ranging from about 80°-300° C. The reaction temperatures may range from about 80° C. to 350° C. or higher provided that said temperature is maintained below the decomposition point of either the reactants or the products obtained thereof. Thus, for example, at least about 50 mole percent, e.g., 50–90 mole percent, of the carboxyl groups of a styrene-maleic interpolymer may be esterified with a high molecular weight aliphatic alcohol and then subsequently reacted with a polyamine compound, etc., to obtain a nitrogen-containing ester having about 2.0 to 50 or 2.0 to 35 molar percent of the carboxylic groups converted to carbonyl-amino groups. If a mixture of alcohols including the high molecular weight and low molecular weight alcohols is used to esterify the carboxyl groups of said interpolymer, then at least about 2.0 molar percent of the carboxyl groups of said interpolymer are reacted with the amino compound, to obtain the carbonyl-amino groups. For purposes of this invention, it is sufficient to have at least about 2.0 molar percent and perferably at least about 5 molar percent of the carboxylic groups, i.e., carboxylic-acid groups, etc., of the carboxy-interpolymer reacted with a amine, etc., to obtain the carbonyl-amino groups. The carbonyl-amino groups may be characterized as comprising amides, imides, amidines, salts or mixtures thereof, depending upon the particular reactants and the conditions, e.g., temperatures, etc., under which the reaction is conducted. The amount of amino compound, hydrazine, or substituted hydrazine is sufficient to neutralize substantially all of the unesterified carboxy groups of the polymer.

The following examples serve to illustrate the preparation of the esters and nitrogen-containing esters of the carboxy-containing interpolymers used in this invention and are not intended as limitng thereof. Unless otherwise indicated in these and the following examples, or in the specification, all parts and percentages are by weight, and temperatures are in degrees centigrade.

EXAMPLE 1

A styrene-maleic interpolymer is obtained by preparing a solution of styrene (16.3 parts by weight) and maleic anhydride (12.9 parts) in a benzene-toluene solution (270 parts; weight ratio of benzene-toluene being 66.5:33.5) and contacting the solution at 86° C. in nitrogen atmosphere for 8 hours with a catalyst solution prepared by dissolving 70% benzoyl peroxide (0.42 part) in a similar benzene-toluene mixture (2.7 parts). The resulting product is a thick slurry of the interpolymer in the solvent mixture. To the slurry there is added mineral oil (141 parts) while the solvent mixture is being distilled off at 150° C. and then at 150° C./200 mm. Hg. To 209 parts of the stripped mineral oil-interpolymer slurry (the interpolymer having a reduced specific viscosity of 0.72) there are added toluene (25.2 parts), n-butyl alcohol (4.8 parts), a commercial alcohol consisting essentially of primary alcohols having from 12 to 18 carbon atoms (56.6 parts) and a commercial alcohol consisting of primary alcohols having from 8 to 10 carbon atoms (10 parts) and to the resulting mixture there is added 96% sulfuric acid (2.3 parts). The mixture is then heated at 150°–160° C. for 20 hours whereupon water is distilled off. An additional amount of sulfuric acid (0.18 parts) together with an additional amount of n-butyl alcohol (3 parts) is added and the esterification is continued until 95% of the carboxy radicals of the polymer has been esterified. To the esterified interpolymer, there is then added aminopropyl morpholine (3.71 parts; 10% in excess of the stoichiometric amount required to neutralize the remaining free carboxy radicals) and the resulting mixture is heated to 150°–160° C./10 mm. Hg to distill off toluene and any other volatile components. The stripped product is mixed with an additional amount of mineral oil (12 parts) and filtered. The filtrate is a mineral oil solution of the nitrogen-containing mixed ester having a nitrogen content of 0.16–0.17%.

EXAMPLE 2

The procedure of Example 1 is followed except that the esterification is carried out in two steps, the first step being the esterification of the styrenemaleic interpolymer with the commercial alcohols having from 8 to 18 carbon atoms and the second step being the further esterification of the interpolymer with n-butyl alcohol.

EXAMPLE 3

The procedure of Example 1 is followed except that the esterification is carried out by first esterifying the styrene-maleic interpolymer with the commercial alcohols having from 8 to 18 carbon atoms until 70% of the carboxyl radicals of the interpolymer have been converted to ester radicals and thereupon continuing the esterification with any yet-unreacted commercial alcohols and n-butyl alcohol until 95% of the carboxyl radicals of the interpolymer have been converted to ester radicals.

EXAMPLE 4

The procedure of Example 1 is followed except that the interpolymer is prepared by polymerizing a solution consisting of styrene (416 parts), maleic anhydride (392 parts) in benzene (2153 parts) and toluene (5025 parts) in the presence of benzoyl peroxide (1.2 parts) at 65°–106° C. (The resulting interpolymer has a reduced specific viscosity of 0.45.)

EXAMPLE 5

The procedure of Example 1 is followed except that the styrene-maleic anhydride is obtained by polymerizing a mixture of styrene (416 parts), maleic anhydride (392 parts), benzene (6101 parts) and toluene (2310 parts) in the presence of benzoyl peroxide (1.2 parts) at 78°–92° C. (The resulting interpolymer has a reduced specific viscosity of 0.91.)

EXAMPLE 6

The procedure of Example 1 is followed except that the styrene-maleic anhydride is prepared by the following procedure: Maleic anhydride (392 parts) is dissolved in benzene (6870 parts). To this mixture there is added styrene (416 parts) at 76° C. whereupon benzoyl peroxide (1.2 parts) is added. The polymerization mixture is maintained at 80°–82° C. for about 5 hours. (The resulting interpolymer has a reduced specific viscosity of 1.24.)

EXAMPLE 7

The procedure of Example 6 is followed except that acetone (1340 parts) is used in place of benzene as the polymerization solvent and that azobis-isobutyronitrile (0.3 part) is used in place of benzoyl peroxide as a polymerization catalyst.

EXAMPLE 8

The procedure of Example 1 is followed except that the styrene-maleic anhydride interpolymer is prepared as follows: To a solution of maleic anhydride (69 parts) in benzene (805 parts) at 50° C. there is added styrene (73 parts). The resulting mixture is heated to 83° C. whereupon benzoyl peroxide (0.19 part) is added and then maintained at 80°–85° C. (The resulting interpolymer has a reduced specific viscosity of 1.64.)

EXAMPLE 9

The procedure of Example 1 is followed except that toluene sulfonic acid (3.5 parts) is used in place of sulfuric acid as the esterification catalyst.

EXAMPLE 10

The procedure of Example 1 is followed except that phosphoric acid (2.5 parts) is used in place of sulfuric acid as the esterification catalyst.

EXAMPLE 11

The procedure of Example 1 is followed except that dodecyl alcohol (0.7 mole per carboxy equivalent of the styrene-maleic anhydride interpolymer) is used in place of the alcohol mixtures having 8 to 18 carbon atoms, and isobutyl alcohol (0.2 mole per carboxy equivalent of the interpolymer) is used in place of n-butyl alcohol.

EXAMPLE 12

The procedure of Example 1 is followed except that eicosyl alcohol (0.8 mole consumed per carboxy equivalent of interpolymer) is used in place of the commercial alcohols having from 8 to 18 carbon atoms and n-pentyl alcohol (0.15 mole consumed per carboxy equivalent of the interpolymer) is used in place of the n-butyl alcohol.

EXAMPLE 13

The procedure of Example 1 is followed except that octyl alcohol (0.8 mole consumed per carboxy equivalent of the interpolymer) is used in place of the commercial alcohols having from 8 to 18 carbon atoms, isopentyl alcohol (0.1 mole consumed per carboxy equivalent of the interpolymer) is used in place of the n-butyl alcohol, and N-aminoethyl and 1-methyl-4-aminoethyl piperazine (0.1 mole consumed per carboxy equivalent of the interpolymer) is used in place of aminopropyl morpholine.

EXAMPLE 14

The procedure of Example 1 is followed except that dimethylamino-ethylamine is substituted for the aminopropyl morpholine used on a molar basis.

EXAMPLE 15

The procedure of Example 1 is followed except that dibutylamino-propylamine is substituted for the aminopropyl morpholine on a molar basis.

EXAMPLE 16

An interpolymer (0.86 carboxyl equivalent) of styrene and maleic anhydride (prepared from an equal molar mixture of styrene and maleic anhydride and having a reduced specific viscosity of 0.67-0.68) is mixed with mineral oil to form a slurry, and then esterified with a commercial alcohol mixture (0.77 mole; comprising primary alcohols having from 8 to 18 carbon atoms) at 150°-160° C. in the presence of a catalytic amount of sulfuric acid until about 70% of the carboxyl radicals are converted to ester radicals. The partially esterified interpolymer is than further esterified with n-butyl alcohol (0.31 mole) until 95% of the carboxyl radicals of the interpolymer are converted to the mixed ester radicals. The esterified interpolymer is then treated with aminopropyl morpholine (slight excess of the stoichiometric amount to neutralize the free carboxyl radicals of the interpolymer) at 150°-160° C. until the resulting product is substantially neutral (acid number of 1 to phenolphthalein indicator). The resulting product is mixed with mineral oil so as to form an oil solution containing 34% of the polymeric product.

EXAMPLE 17

The procedure of Example 1 is followed except that the aminopropyl morpholine used is replaced on a chemical equivalent basis with N-aminoethyl pyrrole.

EXAMPLE 18

The procedure of Example 1 is followed except that the aminopropyl morpholine used is replaced on a chemical equivalent basis with N-aminopropyl thiopyrrolidone.

EXAMPLE 19

The procedure of Example 1 is followed except that the aminopropyl morpholine used is replaced on a chemical equivalent basis with N-aminoethyl caprolactam.

EXAMPLE 20

The procedure of Example 1 is followed except that the aminopropyl morpholine used is replaced on a chemical equivalent basis with N-aminophenyl oxazolidone.

EXAMPLE 21 the procedure of Example 1 is followed except that the aminopropyl morpholine used is replaced on a chemical equivalent basis with 4-aminoethyl thiazole.

EXAMPLE 22

The procedure of Example 1 is followed except that the aminopropyl morpholine used is replaced on a chemical equivalent basis with 2-cyclohexyl triazine.

EXAMPLE 23

The procedure of Example 1 is followed except that the aminopropyl morpholine used is replaced on a chemical equivalent basis with 1-aminoethyl-2-heptadecylimidazoline.

EXAMPLE 24

The procedure of Example 1 is followed except that the aminopropyl morpholine used is replaced on a chemical equivalent basis with N-aminooctyl succinamide.

EXAMPLE 25

The procedure of Example 1 is followed except that the aminopropyl morpholine used is replaced on a chemical equivalent basis with 3-aminobutyl uracil.

EXAMPLE 26

The procedure of Example 1 is followed except that the aminopropyl morpholine used is replaced on a chemical equivalent basis with 4-aminobutyl pyridine.

EXAMPLE 27

The procedure of Example 1 is followed except that the aminopropyl morpholine used is replaced on a chemical equivalent basis with N-aminomethyl phenolthiazine.

EXAMPLE 28

A carboxy interpolymer is obtained by preparing a solution of styrene (16.3 parts by weight) and maleic anhydride (12.9 parts by weight) in a benzene-toluene solution (270 parts; weight ratio of benzene to toluene being 66.5 to 33.5) and contacting the solution at 86° C.

in nitrogen atmosphere for 8 hours with a catalyst solution prepared by dissolving 70% benzoyl peroxide (0.42 part by weight) in a similar benzene-toluene mixture (2.7 parts by weight). The resulting product is a thick slurry of the interpolymer in the solvent mixture. To the slurry there is added mineral oil (141 parts by weight) while the solvent mixture is being distilled off at 150° C. and then at 150° C./200 mm. Hg. To 209 parts by weight of the stripped mineral oil-interpolymer slurry (the interpolymer having a reduced specific viscosity of 0.72) there are added toluene (25.2 parts by weight), n-butyl alcohol (4.8 parts by weight), a commercial alcohol consisting essentially of primary alcohols having from 12 to 18 carbon atoms (56.6 parts by weight) and a commercial alcohol consisting of primary alcohols having from 8 to 10 carbon atoms (10 parts by weight) and to the resulting mixture there is added 96% sulfuric acid (2.3 parts by weight). The mixture is then heated at 150°-160° C. for 20 hours whereupon water is distilled off. An additional amount of sulfuric acid (0.18 part by weight) together with an additional amount of n-butyl alcohol (3.0 parts by weight) is added and the esterification is continued until 95% of the carboxy radicals of the polymer has been esterified. To the esterified interpolymer (400 parts by weight), there is then added hydrazine (64% aqueous solution) (2.7 parts by weight) and the resulting mixture is heated to 150° C. and then to 150° C./100 mm. Hg. to distill off volatile components. The stripped product is mixed with mineral oil (126 parts by weight) and filtered. The filtrate is a mineral oil solution of the nitrogen-containing ester.

EXAMPLE 29

The procedure of Example 28 is followed except that the esterification is carried out in two steps; the first step being the esterification of the styrene-maleic interpolymer with the commercial alcohols having from 8 to 18 carbon atoms and the second step being the further esterification of the interpolymer with n-butyl alcohol.

EXAMPLE 30

The procedure of Example 28 is followed except that the esterification is carried out by first esterifying the styrene-maleic interpolymer with the commercial alcohols having from 8 to 18 carbon atoms until 70% of the carboxyl radicals of the interpolymer have been converted to ester radicals and thereupon continuing the eterification with any unreacted commercial alcohols and n-butyl alcohol until 95% of the carboxyl radicals of the interpolymer have been converted to ester radicals.

EXAMPLE 31

The procedure of Example 28 is followed except that the styrene-maleic anhydride interpolymer is prepared as follows: To a solution of maleic anhydride (69 parts by weight) in benzene (805 parts by weight) at 50° C. there is added styrene (73 parts by weight). The resulting mixture is heated to 83° C. whereupon benzoyl peroxide (0.19 part by weight) is added and then maintained at 80°-85° C. The resulting interpolymer has a reduced specific viscosity of 1.64.

EXAMPLE 32

The procedure of Example 28 is followed except that toluene sulfonic acid (3.5 parts by weight) is used in place of sulfuric acid as the esterification catalyst.

EXAMPLE 33

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.88 mole; comprising primary alcohols having from 8 to 18 carbon atoms) at 150°–160° C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with N,N-dibutyl hydrazine (slight excess of the stoichiometric amount to neutralize the free carboxyl radicals of the interpolymer) at 150°–160° C. until the resulting product is substantially neutral (acid number of 1 to phenolphthalein indicator). The resulting product is mixed with mineral oil so as to form an oil solution containing 34% of the polymeric product.

EXAMPLE 34

To the esterified interpolymer intermediate prepared in Example 1, (400 parts by weight), there is then added hydrazine (64% aqueous solution) (2.7 parts by weight) and the resulting mixture is heated to 150° C. and then to 150° C./100 mm. Hg. to distill off volatile components. The stripped product is mixed with mineral oil (126 parts by weight) and filtered. The filtrate is a mineral oil solution of the nitrogen-containing ester.

EXAMPLE 35

The procedure of Example 34 is followed except that the interpolymer intermediate is prepared by polymerizing a solution consisting of styrene (416 parts by weight), a maleic anhydride (392 parts by weight) in benzene (2153 parts by weight) and toluene (5025 parts by weight) in the presence of benzoyl peroxide (1.2 parts by weight) at 65°–106° C. The resulting interpolymer intermediate has a reduced specific viscosity of 0.45.

EXAMPLE 36

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.77 mole; comprising primary alcohols having from 8 to 18 carbon atoms) at 150°–160° C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with N,N-butyl hydrazine (slight excess of the stoichiometric amount to neutralize the free carboxyl radicals of the interpolymer) at 150°–160° C. until the resulting product is substantially neutral (acid number of 1 to phenolphthalein indicator). The resulting product is mixed with mineral oil so as to form an oil solution containing 34% of the polymeric product.

EXAMPLE 37

Toluene (690 parts) is preheated to 65°–68° C. and charged to a reactor. A mixture of 45.8 parts maleic anhydride and 48.64 parts of styrene is charged to the reactor and mixed with the toluene to form a homogeneous mixture. The temperature is adjusted to 60° C. at 140–150 mm. Hg. A catalyst solution containing 0.1 part of bis(4-t-butylcyclohexyl)peroxydicarbonate in 7.2 parts of toluene is added to the reactor over 1.5–2.0 hours. The reaction is held at 59°–63° C. to 100–150 mm. Hg. After addition of the catalyst is complete, the reaction mixture is held for 4 hours. Typical conversion is 95–96%. The copolymer is present as a slurry in toluene.

The copolymer slurry is transferred to a stripping vessel containing 381.6 parts of mineral oil. The toluene is stripped to 107° C. and 50 mm. Hg.

An ester reactor containing 562.2 parts the copolymer diluent mixture containing about 90.6 parts copolymer in 381.6 parts diluent oil and about 90 parts toluene is charged with 22 parts of a commercial $C_6$–$C_{12}$ alcohol mixture and 125 parts of a commercial $C_{10}$–$C_{20}$ alcohol mixture. Sulfuric acid catalyst (2.2 parts) is added to the reactor. The reaction is held at 148°–157° C. The water of reaction is removed azeotropically. When about 75% of the polymer has been esterified, 12 parts of n-butanol mixed with 0.25 part sulfuric acid is added and the reaction is continued until 85% of the copolymer has been esterified. An additional 12 parts of n-butanol is added and the reaction is continued to 95% conversion. The remaining unesterified copolymer is reacted with about 7–7.5 parts aminopropyl morpholine. The reaction is stripped to 146° C. and 44–55 mm. Hg. until a Pensky-Marten flash point of 70° C. is achieved. The stripped material is filtered at 121° C. with a diatomaceous earth filter aid.

The filtered product is mixed with 72 parts of diluent oil. The resulting product contains about 0.13% nitrogen and about 34% esterified polymer.

EXAMPLE 38

An interpolymer is prepared by reacting (while maintaining the temperature between 99°–105° C.) styrene (536 parts) and maleic anhydride (505 parts) in toluene (7.585 parts) in the presence of a catalyst solution prepared by dissolving benzoyl peroxide (1.5 parts) in toluene (50 parts). The toluene is removed by vacuum stripping as mineral oil (2.228 parts) is added. The oil solution obtained in this manner contains 55.4% oil. The resulting interpolymer (free of oil) has a RSV of 0.42.

A mixture of 561 parts of a behenyl alcohol mixture available from Henkel (a mixture of 17.4 mole percent of $C_{18}$ primary alkanol, 15.6 mole percent of $C_{20}$ primary alkanol and 67 mole percent of $C_{22}$ primary alkkanol), and 668 parts of the above-prepared interpolymer oil solution is heated to a temperature of about 105° C. over a period of 3.5 hours in a nitrogen atmosphere. Methane sulfonic acid (5.1 parts of a 70% aqueous solution) is added at this temperature in 6 minutes whereupon the temperature is raised to about 150° C. over a period of about 50 minutes and 60 parts of toluene is added to maintain reflux. The solution is maintained at 150°–156° C. for 5.5 hours. An additional 7 parts of methane sulfonic acid solution is added over a period of about 9 minutes. The mixture is maintained at 150°–155° C. for about 9 hours, and some water is removed by distillation.

The reaction mixture is then stripped at 130°–155° C. for 1 hour under a vacuum of about 10 torr. The residue is the desired product having a neutralization number of phenolphthalein of 3.0 acid and to bromphenol blue of 1.9 acid (both as determined by ASTM Method D 974).

EXAMPLE 39

To 375 parts of the alcohol mixture of Example 38 is added 445 parts of the interpolymer oil solution of Example 38, and this mixture is heated up to a temperature of about 105° C. over a period of 3 hours in a nitrogen atmosphere. Sulfuric acid (1.4 parts, 93%) is added at this temperature over a period of about 6 minutes followed by heating of the mixture to 150° C. over a period of about 40 minutes. Toluene (40 parts) is added, and the solution is maintained at a temperature of about 150°–155° C. for 5.5 hours with a nitrogen purge. An additional 1.9 parts of sulfuric acid is added at this temperature in 6 minutes, and the reaction mixture is maintained at 150°–155° C. for 9.5 hours while removing water by distillation.

An additional gram of sulfuric acid is added, and the mixture is again maintained at 150°–155° C. for 3 hours. The reaction mixture then is stripped at 130°–155° C. over a period of 1 hour under a vacuum of 10 torr. The residue is the desired product. The product obtained in this manner has a neutralization number to phenolphthalein of 2.9 acid and to bromphenol blue of 0.9 acid.

The above-described esters, mixed esters, and nitrogen-containing mixed esters of carboxy-containing interpolymers can be combined with asphalt by techniques known in the art. Asphalts modified in this manner exhibit improved age hardening characteristics and reduced deterioration.

Generally, the esters of the interpolymers will be mixed with asphalt in the fluid or molten condition to dissolve or disperse the interpolymer in the asphalt. Generally, the asphalt is heated to an elevated temperature to improve the fluidity of the asphalt. Temperatures of from about 100°–225° C. are sufficient although the precise temperature for any particular asphalt will depend on the source and nature of the asphalt material.

The amount of the esters of the carboxy-containing interpolymers included in the modified asphalt compositions of the present invention is an amount which is sufficient to reduce or retard degradation of the asphalt in service. In one embodiment, the amount will, vary from as little as 0.01% up to about 20% or more of the ester based on the weight of the asphalt. Generally, however, the amount of esterified interpolymer will be less than about 10% by weight of the weight of the asphalt. Most often, the amount of interpolymer incorporated in the asphalt will range from about 0.2 to about 3% or 5% by weight.

When mixing the carboxy-containing interpolymers of the present invention with the asphalt material, the asphalt should be at an elevated temperature and in a flowable fluid state. By way of example, a suitable temperature is one at which the bitumen or asphalt is thinner than molasses at ambient temperature, typically thicker than water, and is flowable or pourable without stirring. Thus, a quantity of the asphalt should be sufficiently fluid to flow when placed on a solid surface. This is particularly advantageous if it is contemplated that the asphalt cement would be circulated under high speed agitation to provide a uniform dispersion or solution.

To accomplish the foregoing solution or dispersion, for a conventional asphalt cement (e.g., one designated AR-4000 by the Asphalt Institute, a suitable mixing temperature is on the order of a minimum of about 100° C. for soft asphalt, and, preferably, on the order of 120° C. or more. At temperatures below this level, mixing times for total dispersion, even if feasible, become excessive economically. On the other hand, the temperature of mixing should not be so high as to promote other reactions which could weaken the asphalt material. For this reason, it is preferred not to heat the asphalt cement above about 225° C., and thus, suitable mixing temperatures are from about 100° C. to about 225° C. with a preferred mixing temperature of from 120°–180° C. depending upon the type of asphalt and the mixing times and speeds. At temperatures on the order of 170° C., 20 to 30 minutes are sufficient under conventional mechanical stirring speeds as with an impeller type stirrer. On the other hand, mixing times as low as several minutes may be sufficient under certain circumstances. In some instances, it may be desirable to perform the mixing step under an inert gas atmosphere such as nitrogen. The use of nitrogen precludes the presence of oxygen at elevated temperatures which tends to harden the final product.

The modified asphalt compositions of the present invention are particularly useful for preparing improved roofing asphalts, other asphalt coating compositions, and particularly for preparing improved aggregate-containing asphalts such as employed in the paving of roads, bridges, airport runways, sidewalks, etc. The modified asphalt compositions of the present invention in fluid form are mixed generally with preheated, predried aggregates to form the homogeneous mixture of uniformly coated aggregates in a paving composition, typically as performed at an asphalt mixing plant. The aggregate preferably is heated under conditions of time and temperature to drive off essentially all free moisture prior to mixing. During mixing, both the aggregate and the modified asphalt are typically at temperatures of about 100°–160° C. Before the composition is cooled to a temperature at which it looses its workability, the composition is spread on a road bed, compacted and permitted to cure. After curing, the road comprises aggregate bound by a matrix of modified asphalt binder.

The modified asphalt compositions of the present invention, after formation, may be handled by conventional techniques to maintain them in fluid form under road-building conditions. For example, the modified asphalts may be formed into a cutback by fluxing the asphalt with a suitable volatile solvent or distillate. The modified asphalt cutback may then be directly mixed with aggregate and applied as paving composition in fluid form, possibly at ambient temperatures. Another conventional technique for fluidizing the modified asphalt cement prior to mixing with aggregate and forming into a paving composition is to emulsify the modified asphalt by known techniques. An advantage of this method of fluidizing is that after mixing with the aggregate, it may be applied as a paving composition at ambient temperature.

The term "aggregate" as used in the specification and claims is intended to include solid particles having a range of sizes including fine particles such as sand to relatively coarse particles such as crushed stone, gravel or slag.

The ratio of aggregate to modified bitumen or asphalt depends upon their properties and the desired end use. For typical road paving compositions, the paving composition will comprise a minimum of about 85% by weight of aggregate, and generally between about 90–96% by weight of the total paving composition will be aggregate.

Aggregate containing modified asphalt compositions can be prepared in accordance with the present invention by techniques known to the art. In one method, a modified asphalt cement is prepared in accordance with the method of the present invention, and the modified asphalt cement thereafter is mixed with an aggregate at an elevated temperature to form the desired paving composition.

The modified asphalt compositions of the present invention, and the aggregate containing asphalt compositions prepared utilizing the modified asphalt compositions of the present invention are characterized by an ability to retain their desirable characteristics in service. In particular, the modified asphalts of the present invention retain their consistency and ductility for longer periods in service than do asphalt compositions which have not been modified in accordance with the present invention.

The following examples illustrate the modified asphalt compositions and aggregate-containing compositions of the present invention.

EXAMPLE A

A California coastal asphalt cement (CC) meeting the specification of AAHSTO AR 4000 is modified with 3% by weight based on the weight of the asphalt of the nitrogen-containing mixed ester of Example 37 (containing 65% in mineral oil) by thoroughly mixing the mixed ester with the fluidized asphalt.

EXAMPLE B

The procedure of Example A is repeated except that the asphalt cement is a California Valley asphalt cement (CV) meeting the AAHSTO AR 4000 specifications.

EXAMPLE C

The procedure of Example A is repeated except that the product of Example 37 is replaced by an equivalent amount of the product of Example 28.

EXAMPLE D

|     |     | Component | Amount (% wt) |
| --- | --- | --- | --- |
| (1) |     | Aggregate | 93.5 |
|     | (A) | Crushed Canadian limestone #8 | 49.2 |
|     | (B) | Lake Sand | 50.8 |
|     |     | Gradation | (% Passing) |
|     |     | ½" | 100.0 |
|     |     | ⅜" | 98.0 |
|     |     | #4 | 60.0 |
|     |     | #16 | 46.5 |
|     |     | #50 | 10.8 |
|     |     | #200 | 1.8 |
| (2) |     | Modified Asphalt of Example A | 6.5 |

Liquid asphalt cements treated with the compositions of the invention show major benefits in retained ductility and/or flexibility when exposed to severe aging as demonstrated by a modified Tilt-Oven Asphalt Durability Test and the Rolling Thin Film Oven Test. Measurements of low temperature elastic modulus, after accelerated laboratory aging, show significant improvement with the presence of the nitrogen-containing mixed esters of the present invention.

The modified asphalt cement of Example A is exposed to oxidative conditions and compared to the test minimum. The test employed is the Rolling-Thin Film Oven Test (ASTM D-2872-84), a standard test method to evaluate the effect of heat and air on a moving film of semi-solid asphaltic material. A moving film of asphaltic material is heated in a specially equipped convection oven for 75 minutes at 325° F. (163° C.). Heated air is blown into each container once each revolution. The amount of hardening is determined from changes in physical test values as measured before and after oven treatment. ASTM Procedure D-2872-84 is herein incorporated by reference.

The test results are summarized in the following Table I.

TABLE I

TEST RESULTS
ROLLING THIN-FILM OVEN TEST
(ASTM D-2872-84)

| Property | Asphalt of Example A | Requirements ASTM D-3381, AR 4000 |
|---|---|---|
| TEST ON RESIDUE FROM RTFO: | | |
| Abs. Vis. @ 140° F. (poise) | 3090 | 3000–5000 |
| Kinematic Vis. @ 275° F. (cst, min) | 522 | 275 |
| Pen. @ 77° F. (min) | 63 | 25 |
| % of Original Pen. (min) | 45 | 45 |
| Ductility @ 77° F. (cm, min) | 150+ | 75 |

The modified asphalt cement of Example A also is subjected to a modified Tilt-Oven Asphalt Durability Test similar to one developed by California Department of Transportation personnel in an effort to establish an accelerated laboratory procedure to simullate field aging in hot climates. The method, as well as data correlating laboratory and field aging, is published in the AAPT 1981 Proceedings. The presentation is entitled "A Comparison of Field and Laboratory Environments on Asphalt Durability". The authors are Glenn R. Kemp and Nelson H. Predoehl. The test procedure is correlated to 24 months in a hot desert climate.

The test procedure to run the modified tilt-oven asphalt durability test utilizes the apparatus required for ASTM D-2872-84 (Rolling Thin Film Oven Test) with slight modifications to age asphalt at 212° F. (100° C.) for 168 hours. The California test conditions simulate the effect of field weathering for two years in a hot desert site. The test conditions for the modified tilt-oven test are somewhat milder than those employed by the California test (i.e., 168 hrs at 113° C.). The effects of this age hardening are determined from measurements made on the residue.

The test results appear in the following Table II.

TABLE II

TEST RESULTS
MODIFIED TILT-OVEN ASPHALT DURABILITY TEST

| Test AC | CC-AR4000 Untreated | CC-AR4000 +3% Example | Caltrans Durable AC Spec. |
|---|---|---|---|
| PROPERTY TESTED | | | |
| Vis. @ 140° F. (poise) - unaged | 1080 | 808 | |
| Vis. @ 140° F. (poise) - aged | 87,020 | 20,706 | 75,000 Max. |
| Viscosity Increase-poise | 80.6 | 25.6 | |
| Pen. @ 77° F. (dmm) - unaged | 91 | 145 | |
| Pen. @ 77° F. (dmm) - aged | 19 | 32 | 25 Min. |
| Ductility @ 77° F. (cm) - unaged | 120+ | 150+ | |
| Ductility @ 77° F. (cm) - aged | 8.8 | 150+ | 30 Min. |

The improvement in ductility at 77° F. after this severe laboratory aging procedure is noteworthy. It indicates that a roof or pavement will retain flexibility and ductility after long exposure to weathering.

Conventional asphalt additives also may be included in the modified asphalt compositions of the invention. For example, organic manganese compounds such as manganese naphthenate, manganese acetate, manganese octoate either alone or in combination with organic cobalt compounds are useful in improving the high temperature properties and increasing compressive, flexural and fatigue strength of cured road pavements. Asphalts containing such additives are described in U.S. Pat. No. 4,234,346, and the specification of this patent is incorporated herein by reference for its disclosure of manganese and manganese cobalt additives for asphalt.

The use of manganese chloride to modify the properties of asphalt cements is described in U.S. Pat. No. 4,244,747. The disclosure of this patent is herein incorporated by reference. Other functional additives can be included to improve water resistance, high and low temperature characteristics and age hardening.

What is claimed is:

1. A modified asphalt composition comprising
(A) asphalt, and
(B) a minor amount, sufficient to reduce or retard degradation of the asphalt in service, of at least one carboxy ester-containing interpolymer derived from
  (B-1) at least one olefin monomer, and
  (B-2) at least one alpha, beta-unsaturated carboxylic acid or derivative thereof, said interpolymer having (1) pendant carboxylic acid ester groups derived from the esterification of the carboxy groups of the interpolymer with at least one alcohol containing at least about 4 carbon atoms; wherein the carboxy ester interpolymer also has (2) at least one pendant carbonyl-polyamino group derived from the reaction of at least one of the carboxy groups of the interpolymer with (2-a) at least one amino compound having at least one primary or secondary amino group and/or (2-b) hydrazine or at least one hydrocarbon-substituted hydrazine.

2. The asphalt composition of claim 1 wherein the carboxy ester groups (1) are mixed ester groups derived from (1-a) at least one higher molecular weight alcohol containing at least 7 carbon atoms and (1-b) at least one lower molecular weight alcohol containing from one to 6 carbon atoms.

3. The asphalt composition of claim 1 wherein the carbonyl-polyamino group is derived from (2-a).

4. The asphalt composition of claim 1 wherein the alcohol contains from about 8 to about 24 aliphatic carbon atoms.

5. The asphalt composition of claim 2 wherein the higher molecular weight alcohol (1-a) contains from about 8 to about 24 carbon atoms and a lower molecular weight alcohol (1-b) contains from about 3 to about 5 carbon atoms.

6. The asphalt composition of claim 1 wherein the amino compound (1-b) is derived from a primary-aminoalkyl-substituted tertiary amine.

7. The asphalt composition of claim 1 wherein the asphalt is a substantially unblown asphalt cement.

8. The composition of claim 1 wherein the olefin monomer (B-1) is a vinyl aromatic monomer.

9. The composition of claim 8 wherein the vinyl aromatic monomer contains up to about 12 carbon atoms.

10. The composition of claim 1 wherein (B-2) is maleic acid, fumaric acid, alkyl esters of one of these acids, maleic anhydride or mixtures thereof.

11. The composition of claim 10 wherein (B-2) is maleic acid or maleic anhydride.

12. The composition of claim 1 wherein the molar ratio of olefin monomer to unsaturated acid or derivative in the interpolymer is from about 3:1 to about 1:10.

13. The composition of claim 1 containing from about 0.01 to about 10% by weight of (B) based on the weight of asphalt.

14. The asphalt composition of claim 1 wherein the olefin monomer (B-1) is a vinyl aromatic monomer.

15. The composition of claim 14 wherein the vinyl aromatic monomer contains up to about 12 carbon atoms.

16. The composition of claim 1 wherein (B-2) is maleic acid, fumaric acid, alkyl esters of one of these acids, maleic anhydride or mixtures thereof.

17. The composition of claim 1 wherein the molar ratio of olefin monomer to unsaturated acid or derivative in the interpolymer is from about 3:1 to about 1:10.

18. The composition of claim 1 containing from about 0.01 to about 10% by weight of (B) based on the weight of asphalt.

19. A modified asphalt composition capable of improving the flexibility and longevity characteristics of an aggregate-containing paving composition made therefrom comprising
(A) a substantially unblown and unoxidized asphalt, and
(B) from about 0.01 to about 10% by weight, based on the weight of the asphalt of at least one nitrogen-containing mixed ester of a carboxy-containing interpolymer of
  (B-1) at least one vinyl aromatic monomer, and
  (B-2) at least one alpha, beta-unsaturated acid, or derivative thereof, said mixed ester of said interpolymer being characterized by the presence within its polymeric structure of at least one of each of three pendant polar groups derived from the carboxy groups of said ester;
    (1-a) a relatively high molecular weight carboxylic ester group having from about 7 to about 24 aliphatic carbon atoms in the ester,
    (1-b) a relatively low molecular weight carboxylic ester group having no more than 6 aliphatic carbon atoms in the ester,
    (2-a) a carbonyl-amino group derived from a amino compound having one primary or secondary amino group, and
wherein the molar ratio of (1-a):(1-b):(2-a) is (60–90):(10–30):(2–15).

20. The composition of claim 19 wherein (B-1) is a styrene.

21. The composition of claim 19 wherein the unsaturated acid or derivative (B-2) is maleic acid or maleic anhydride.

22. The composition of claim 19 wherein the molar ratio of (B-1) to (B-2) is from 3:1 to about 1:3.

23. The composition of claim 22 wherein the molar ratio is about 1:1.

24. The composition of claim 19 wherein the unesterified interpolymer has an RSV within the range of from about 0.05 to about 2.0.

25. The composition of claim 19 containing from about 0.1 to about 5% by weight of (B).

26. The composition of claim 19 wherein (2-a) is derived from a primary-aminoalkyl-substituted tertiary amine.

27. The composition of claim 19 wherein the interpolymer (B) is a terpolymer of about one molar proportion of styrene, one molar proportion of maleic anhydride, and less than about 0.3 molar proportion of an aliphatic vinyl monomer.

28. A modified asphalt composition characterized by improved flexibility and longevity characteristics comprising
(A) an asphalt, and
(B) from about 0.01 to about 10% by weight based on the weight of the asphalt of at least one nitrogen-containing mixed ester of a carboxy-containing interpolymer prepared by the process which comprises the steps of
  (1) partially esterifying an interpolymer of at least one vinyl aromatic monomer and at least one alpha, beta-unsaturated acid, or derivative thereof, said interpolymer having a reduced specific viscosity of from about 0.05 to about 2 with a mixture of a relatively high molecular weight alcohol containing at least 7 aliphatic carbon atoms, and a relatively low molecular weight alcohol having no more than 6 carbon atoms so as to convert from about 50 to about 98% of the carboxy groups of said interpolymer to ester groups, the molar ratio of the relatively high molecular weight alcohol to the relatively low molecular weight alcohol being from about 2:1 to about 9:1, and
  (2) substantially neutralizing the remaining carboxy groups of said interpolymer with a amino compound having at least one primary or secondary amino group and/or hydrazine or at least one hydrocarbon-substituted hydrazine.

29. The composition of claim 28 wherein the esterification of step (1) is carried out in a stepwise manner by esterifying the interpolymer first with the relatively high molecular weight alcohol and then with the relatively low molecular weight alcohol.

30. The composition of claim 28 wherein the amino compound is a primary-amino alkyl-substituted tertiary amine.

31. A paving composition containing the modified asphalt composition of claim 1.

32. A paving composition containing the modified asphalt composition of claim 19.

33. An asphalt concrete composition comprising at least about 85% by weight aggregate and the modified asphalt composition of claim 1.

34. An asphalt concrete composition comprising at least about 85% by weight aggregate and the modified asphalt composition of claim 19.

35. An asphalt concrete composition comprising at least about 85% by weight aggregate and the modified asphalt composition of claim 26.

36. An asphalt concrete composition comprising at least about 85% by weight aggregate and
(A) asphalt, and
(B) from about 0.01 to about 10% by weight, based on the weight of the asphalt of at least one nitrogen-containing mixed ester of a carboxy-containing interpolymer of
(B-1) at least one vinyl aromatic monomer, and
(B-2) at least one alpha, beta-unsaturated acid, or derivative thereof, said mixed ester of said interpolymer being characterized by the presence within its polymeric structure of at least one of each of three pendant polar groups derived from the carboxy groups of said ester;
(1-a) a relatively high molecular weight carboxylic ester group having from about 7 to about 24 aliphatic carbon atoms in the ester,
(1-b) a relatively low molecular weight carboxylic ester group having no more than 6 aliphatic carbon atoms in the ester,
(2-a) a carbonyl-amino group derived from a amino compound having one primary or secondary amino group, and
wherein the molar ratio of (1-a):(1-b):(2-a) is (60–90):(10–30):(2–15).

37. The asphalt concrete of claim 36 wherein (B-1) is a styrene.

38. The asphalt concrete of claim 36 wherein (B-2) is maleic acid or maleic anhydride.

39. The asphalt concrete of claim 36 wherein (2-a) is derived from a primary-aminoalkyl-substituted tertiary amine.

* * * * *